(12) United States Patent
Hoffmann

(10) Patent No.: US 6,914,236 B2
(45) Date of Patent: Jul. 5, 2005

(54) SCANNING MICROSCOPE

(75) Inventor: Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 355 days.

(21) Appl. No.: 10/023,187

(22) Filed: Dec. 17, 2001

(65) Prior Publication Data

US 2002/0109101 A1 Aug. 15, 2002

(30) Foreign Application Priority Data

Dec. 19, 2000 (DE) .......................................... 100 63 276

(51) Int. Cl.⁷ .............................. G02B 27/40; H01J 3/14
(52) U.S. Cl. ..................... 250/234; 250/201.3; 359/368
(58) Field of Search .......................... 250/201.2, 201.3, 250/234, 235, 236, 216, 458.1; 359/368, 379, 383, 389; 356/604, 624

(56) References Cited

U.S. PATENT DOCUMENTS 5,731,588 A    3/1998  Hell et al. ................ 250/458.1
6,084,698 A    7/2000  Bleicher et al. ............ 359/204
6,492,638 B2 * 12/2002  Hoffmann .................... 250/234
2002/0024007 A1 *  2/2002  Engelhardt et al. ......... 250/234

FOREIGN PATENT DOCUMENTS

| DE | 4416558 | 8/1995 |
| WO | 9521393 | 8/1995 |
| WO | 9604583 | 2/1996 |
| WO | 9906856 | 2/1999 |

* cited by examiner

Primary Examiner—Kevin Pyo
(74) Attorney, Agent, or Firm—Davidson, Davidson & Kappel, LLC

(57) ABSTRACT

The scanning microscope comprises an illumination beam path (41), microscope optics (37) and at least one light source (17, 21, 61, 67), which generates an excitation light beam (19, 63) of a first wavelength and an emission light beam (23, 69) of a second wavelength. The first focal region and the second focal region overlap partially. The optical properties of the components arranged in the illumination beam path (41) are matched to one another such that optical aberrations are corrected in such a way that the focal regions remain static relative to one another irrespective of the scanning movement.

11 Claims, 3 Drawing Sheets

SCANNING MICROSCOPE

CROSS REFERENCE TO RELATED APPLICATIONS

This invention claims priority of the German patent application 100 63 276.9-42 which is incorporated by reference herein.

FIELD OF THE INVENTION

The invention relates to a scanning microscope having an illumination beam path, microscope optics and having at least one light source, which generates an excitation light beam of a first wavelength and an emission light beam of a second wavelength, the excitation light beam being focussed onto a first focal region in a first plane and the emission light beam being focussed onto a second focal region in a second plane in a sample, and the excitation light beam optically exciting the sample in the first focal region and the emission light beam generating stimulated emission in the second focal region, and the first and second focal regions overlapping at least partially.

BACKGROUND OF THE INVENTION

In scanning microscopy, a sample is illuminated with a light beam in order to observe the reflected or fluorescent light emitted by the sample. The focus of the illumination light beam is moved in an object plane with the aid of a controllable beam-deflection device, generally by tilting two mirrors, the deflection axes usually being mutually perpendicular so that one mirror deflects in the x direction and the other deflects in the y direction. The mirrors are tilted, for example, with the aid of galvanometer control elements. The power of the light coming from the object is measured as a function of the position of the scanning beam. The control elements are usually equipped with sensors to ascertain the current mirror setting.

Especially in confocal scanning microscopy, an object is scanned with the focus of a light beam in three dimensions.

A confocal scanning microscope generally comprises a light source, focusing optics by which the light from the light source is focused onto a pinhole (the so-called excitation aperture), a beam splitter, a beam-deflection device for beam control, microscope optics, a detection aperture and the detectors for registering the detection or fluorescent light. The illumination light is usually input via a beam splitter. The fluorescent or reflected light coming from the object travels back via the beam-deflection device to the beam splitter, and passes through the latter in order to be subsequently focused onto the detection aperture, behind which the detectors are located. Detection light which does not originate directly from the focus region takes a different light path and does not pass through the detection aperture, so that point information is obtained which leads to a three-dimensional image by sequential scanning of the object. A three-dimensional image is usually achieved through layer-by-layer imaging. Instead of guiding illumination light over or through the object using a beam-deflection device, it is also possible to move the object while the illumination light beam is static. Both scanning methods, beam scanning and object scanning, are known and widespread.

The power of the light coming from the object is measured at set time intervals during the scanning process, and hence scanned scan-point by scan-point. The measurement value must be assigned uniquely to the relevant scan position, so that an image can be generated from the measurement data. To that end, it is expedient to measure the state data of the adjustment elements of the beam-deflection device continuously at the same time or, although this is less accurate, to use directly the setpoint control data of the beam-deflection device.

It is also possible in a transmitted-light arrangement, for example, to detect the fluorescent light or the transmission of the excitation light on the condenser side. The detection light beam does not then travel to the detector via the scanning mirrors (non-descan arrangement). For detection of the fluorescent light, the transmitted-light arrangement would need a detection aperture on the condenser side in order to achieve three-dimensional resolution, as in the described descan arrangement. In the case of two-photon excitation, however, a detection aperture on the condenser side can be omitted since the excitation probability depends on the square of the photon density (~intensity$^2$), which is naturally much higher at the focus than in the neighbouring regions. The vast majority of the fluorescent light to be detected therefore originates with high probability from the focus region, which obviates the need for further differentiation, using an aperture arrangement, between fluorescence photons from the focus region and fluorescence photons from the neighbouring regions.

The resolving power of a confocal scanning microscope is dictated, inter alia, by the intensity distribution and the spatial extent of the focal region of the illumination light beam. An arrangement to increase the resolving power for fluorescence applications is known from PCT/DE/95/00124. This arrangement comprises a light source, which generates an excitation light beam of a first wavelength and an emission light beam of a second wavelength, the excitation light beam being focussed onto a first focal region and the emission light beam being focussed onto a second focal region in a sample, which overlaps partially with the first focal region. The excitation light beam excites optically the sample in the first focal region, while the emission light beam generates stimulated emission in the second focal region. Only the spontaneously emitted light from the part of the first focal region in which no stimulated emission has been generated is then detected, so that an improvement in the resolution is achieved overall. The term STED (Stimulated Emission Depletion) has become attributed to this method.

Since then, STED technology has been developed further to the extent that an increase in the resolution can be achieved both laterally and axially, by providing the focal region of the emission light beam with an intensity distribution which vanishes on the inside. Expressed simply, the focal region is, so to speak, internally hollow. Such an intensity distribution can be achieved, for example, with the aid of a $\lambda/2$ plate, which is fitted in a Fourier plane relative to the focal plane of the emission light beam, whose diameter is less than the beam diameter and which is consequently illuminated all round. The focal region of the emission light beam must be made congruent with the focal region of the excitation light beam. Only spontaneously emitted light from the region of vanishing intensity in the focal region of the emission light beam will then still be detected. In theory, resolutions far smaller than 100 nm can be achieved with such arrangements.

It is crucially important that the focal regions of the emission light beam and the excitation light beam be made to overlap suitably.

Even well-corrected high-end optical elements have residual aberrations, which are usually negligible in conventional microscopy but become highly significant in the resolution range considered here. In particular, owing to residual chromatic aberrations, the differing wavelengths of the emission light beam and the excitation light beam lead to serious errors. For example, just the axial chromatic aberration of high-end microscope objectives amounts to about 150 nm, and is therefore above the resolving power theoretically achievable with STED. In the case of a beam-scanning system, lateral aberrations are also added to the axial aberrations, so that the overlap region varies both axially and laterally during the scanning movement.

SUMMARY OF THE INVENTION

It is therefore an object of the invention to provide a scanning microscope having optical means which are configured in such a way that a resolution required for STED microscopy is achievable.

This object is achieved by a scanning microscope comprising:

At least one light source for generating an excitation light beam of a first wavelength and an emission light beam of a second wavelength, microscope optics for focusing the excitation light beam onto a first focal region in a first plane of a sample and for focusing the emission light beam onto a second focal region in a second plane of the sample, whereby the excitation light beam optically excites the sample in the first focal region and the emission light beam generates stimulated emission in the second focal region, and whereby the first and second focal regions are overlapping at least partially, said light source and said microscope optics defining an illumination beam path means for scanning the excitation light beam and the emission light beam onto a sample, components for guiding and shaping being arranged in the illumination beam path, whereby optical properties of the components and of the microscope optics are matched to one another such that optical aberrations are corrected in such a way that the focal regions remain static relative to one another irrespective of the scanning movement.

The invention has the advantage that the theoretical resolving power of STED technology can be achieved in both object-scanning and beam-scanning systems.

It is crucially important that the focal regions of the emission light beam and the excitation light beam be made to overlap suitably. Furthermore, this overlap must also be preserved when scanning the sample. Overlapping involves a spatial interrelationship of the two light beams, which will not be changed by the scanning process.

According to the invention, in particular, chromatic aberrations such as axial chromatic aberration, chromatic difference of magnification or lateral chromatic aberration, are corrected. Such correction can be achieved in a particularly advantageous way by extra optics in the subsidiary beam paths, of the illumination-light beam path, along which only the excitation light beam or only the emission light beam travels. In these subsidiary beam paths, the axial and lateral beam properties can be specifically influenced. It is then possible to compensate for any remaining axial chromatic aberration, for example, by providing optical paths of different lengths between the focal regions and the light sources of the excitation light beam and the emission light beam.

It is also particularly advantageous to correct monochromatic aberrations such as spherical aberrations, coma, astigmatism, field curvature or distortion, by extra optics in the subsidiary beam paths, of the illumination-light beam path, along which only the excitation light beam or only the emission light beam travel. Nevertheless, correction in the part of the illumination-light beam path along which the excitation light beam and the emission light beam travel together is also favourable. The correction may involve lenses, drift sections, and also adaptive optics or active optics. For instance, it is conceivable to use a deformable mirror, for example a sheet mirror or an array of micromirrors, the curvature or setting of which varies during the scanning movement. An LCD element, preferably in a Fourier plane relative to the focal plane, which varies the phase of the excitation light beam or the emission light beam, or parts of the excitation light beam or the emission light beam, may also be provided as adaptive optics in the illumination beam path.

BRIEF DESCRIPTION OF THE DRAWINGS

The subject-matter of the invention is schematically represented in the drawing and will be described below with the aid of the figures, in which.

DETAILED DESCRIPTION OF THE INVENTION

Figure 1:
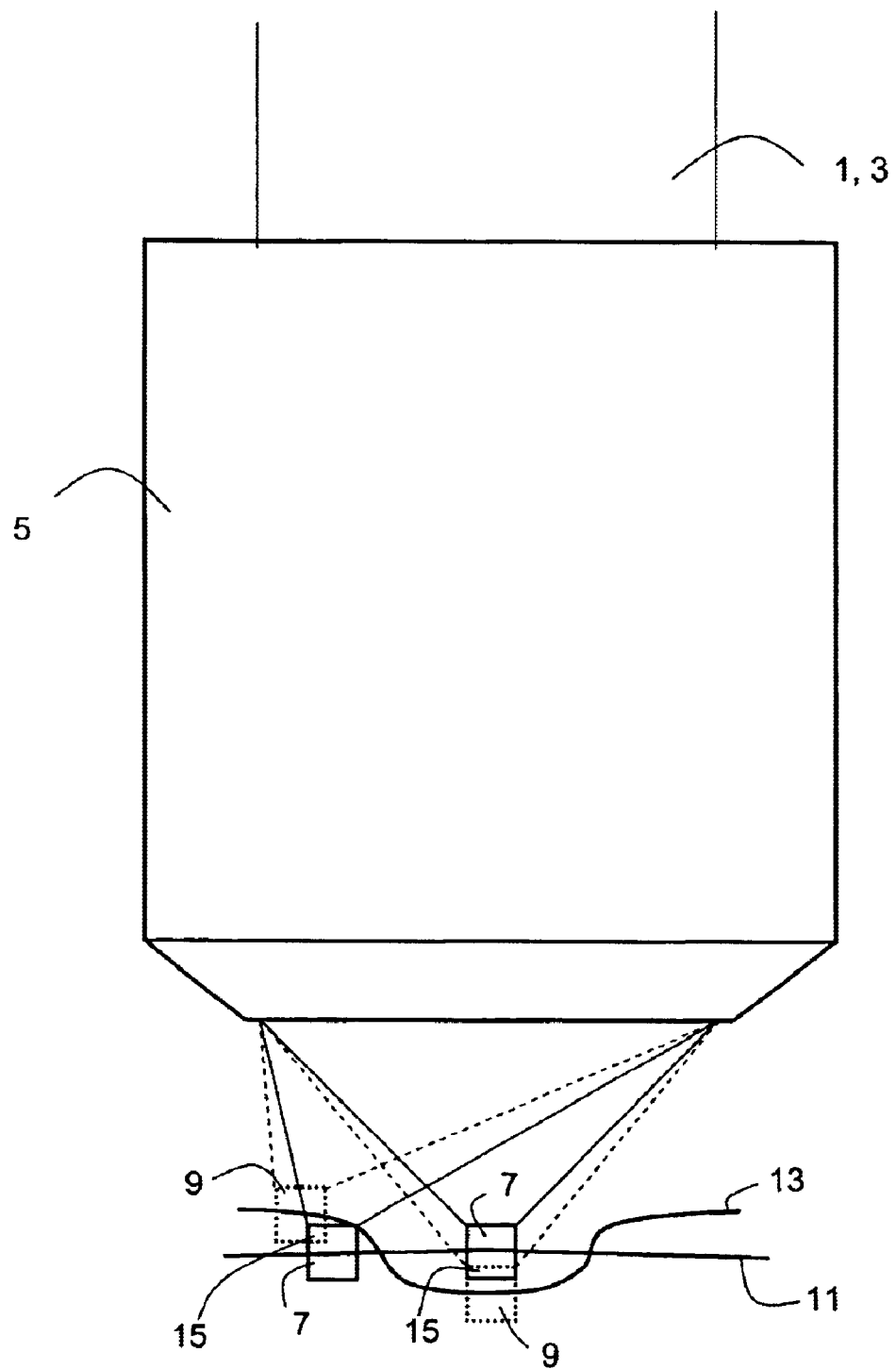
FIG. 1 shows a schematic representation of the tracks of the focal regions of the excitation light beam and the emission light beam in a conventional system.

FIG. 1 schematically shows the profile of the tracks of the focal regions of the excitation light beam 1 and the emission light beam 3 in a conventional beam-scanning system. The excitation light beam 1 and the emission light beam 3 are focussed by the microscope optics 5. The focal region 7 of the excitation light beam is represented by solid lines. It follows the line 11 as the scanning movement is executed. The focal region 9 of the emission light beam is represented by dashes. It follows the line 13 as the scanning movement is executed. The overlap region 15 changes as the scanning movement is executed. Owing to axial chromatic aberration, the focal regions 7 and 9 do not become congruent even in the vicinity of the optical axis. Away from the optical axis, this axial aberration is supplemented by the transverse chromatic aberration, together with field curvature or distortion, so that the focal regions 7 and 9 are offset both laterally and axially relative to one another.

Figure 2:
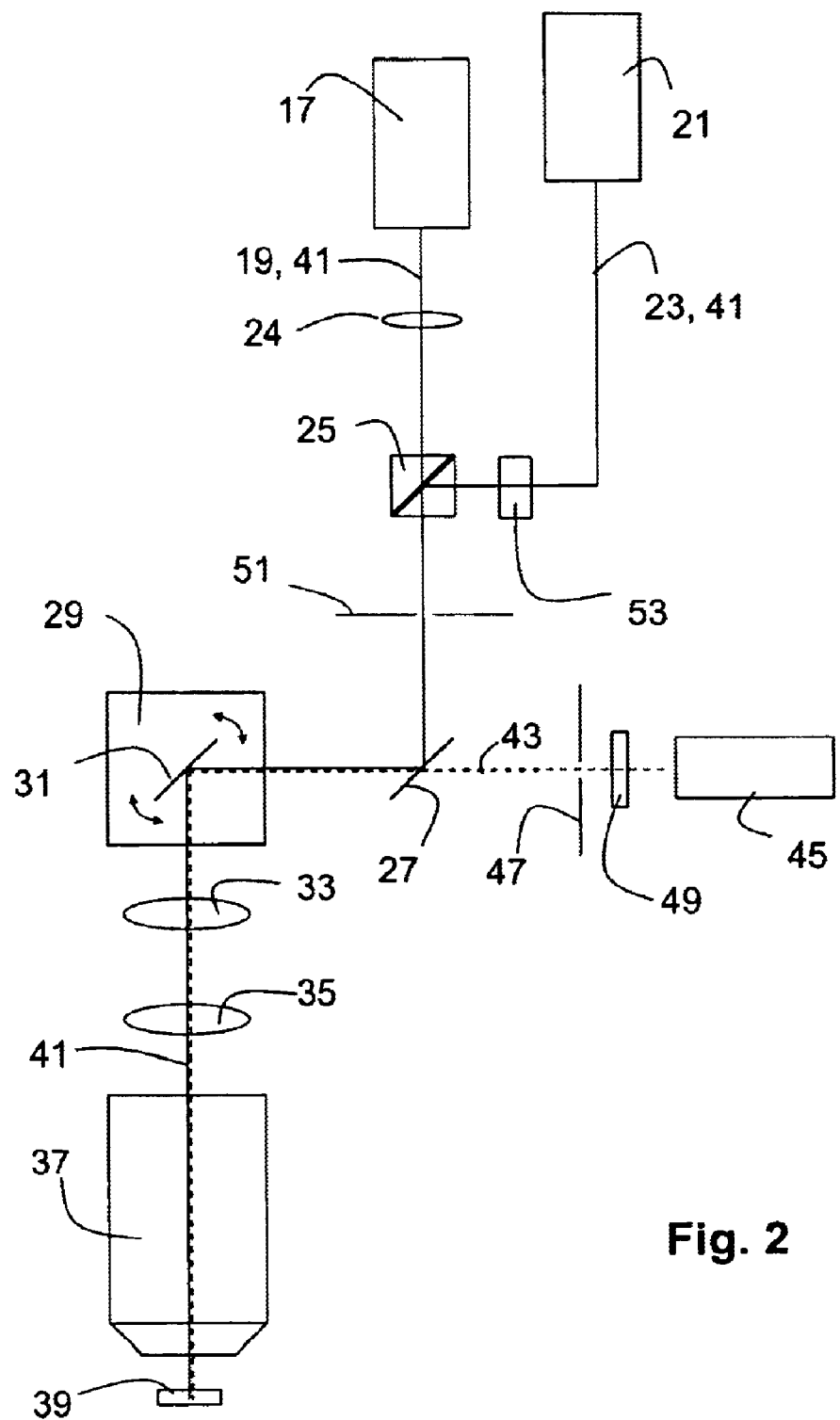
FIG. 2 shows a scanning microscope according to the invention.

FIG. 2 shows a scanning microscope according to the invention, which is embodied as a confocal scanning microscope. The first light source 17, which is embodied as a pulse laser, generates the excitation light beam 19. The second light source 21, which is also a pulse laser, generates the emission light beam 23. The excitation light beam 19 and the emission light beam are combined by the dichroic beam combiner 25 and travel via the dichroic beam splitter 27 to the scanning module 29, which involves a cardan-suspended scanning mirror 31 that guides the excitation light beam 19 and the emission light beam 23 via the scanning optics 33, the optics 35 and, through the microscope optics 37, over or through the sample 39. The sample 39 is arranged on a microscope stage (not shown), which permits scanning in the z direction, in the direction of the excitation light beam 19. The various focal planes of the sample 39 are scanned successively by the excitation light beam 19 and the emission light beam 23. The excitation light beam 19 and the emission light beam 23 form the illumination-light beam path 41, which is represented as an unbroken line. The light 43 leaving the sample travels through the microscope optics 37 and, via the scanning module 29, to the beam splitter 27, passes through the latter and strikes the detector 45, which is embodied as a photomultiplier. The light 43 leaving the sample 39 is represented as a dashed line. Electrical detection signals proportional to the power of the light 43 leaving the object are generated in the detector 45 and are sent on to a processing unit (not shown). A bandpass filter 49, which stops out the light with the wavelength of the emission light beam 23, is arranged in front of the detector. The illumination pinhole 51, which is customarily provided in a confocal scanning microscope, and the detection pinhole 47 are schematically indicated for the sake of completeness. However, some of the optical elements for guiding and shaping the light beams are omitted for the sake of clarity. They are adequately known to a specialist working in this field. So that the focal regions of the excitation light beam 19 and the emission light beam 23 remain static relative to one another even while the scanning movement is executed, focussing optics 24 are provided between the first light source 17 and the dichroic beam combiner 25. Together with the different lengths of the optical paths from the first and second light sources 17 and 21 to the dichroic beam combiner 25, compensation is obtained for the axial chromatic aberration of all the other optics of the illumination-light beam path 41. To compensate for lateral aberrations, adaptive optics 53, which are embodied as an LCD element, are arranged between the second light source 21 and the dichroic beam splitter. They are controlled as a function of the setting of the scanning mirror 31 in the beam-deflection device 29.

Figure 3:
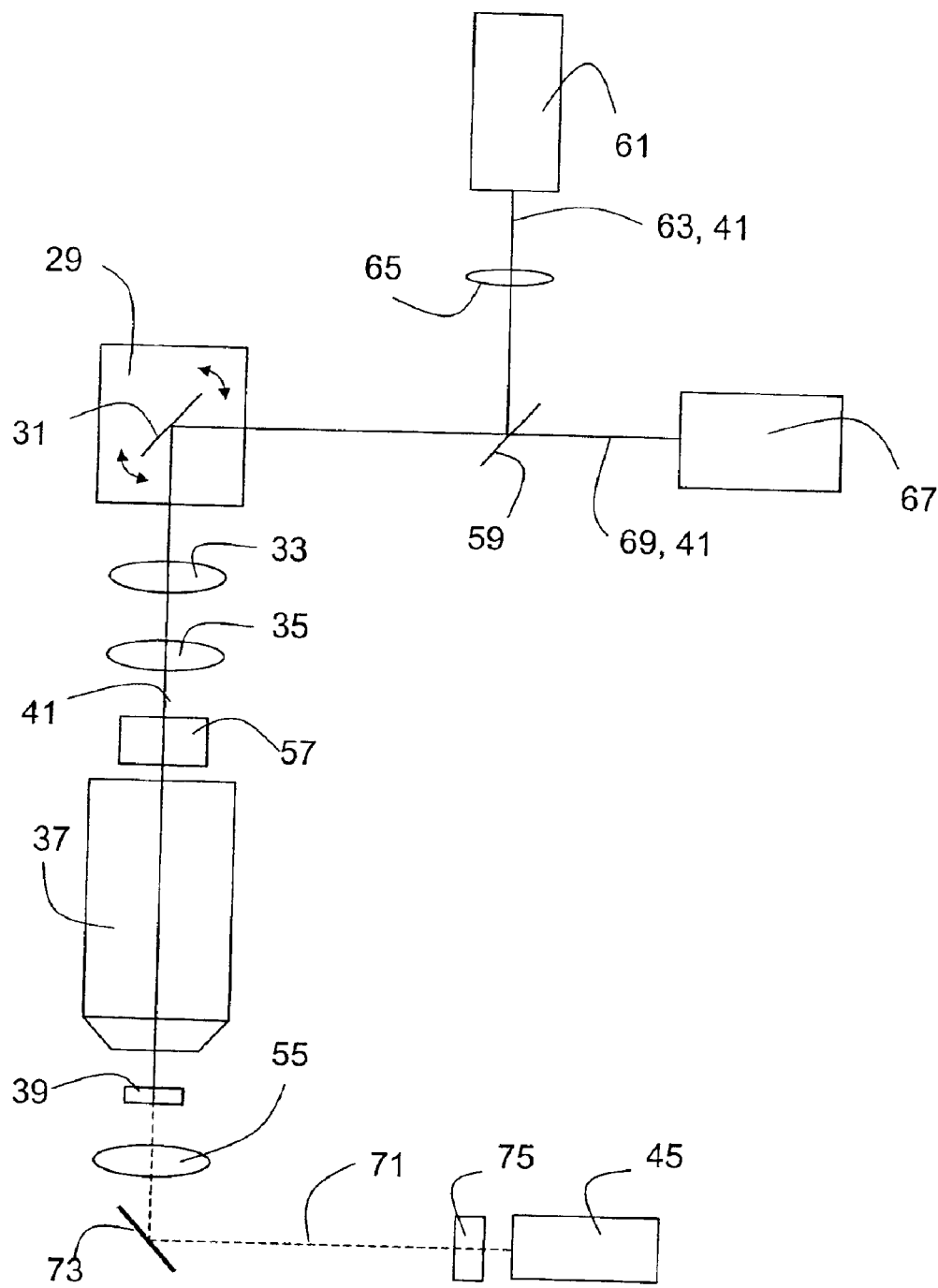
FIG. 3 shows a scanning microscope according to the invention in a non-descan arrangement and with multiphoton excitation.

FIG. 3 shows a scanning microscope according to the invention in a non-descan arrangement with multiphoton excitation. In this arrangement, the detection takes place on the condenser side. The illumination pinhole and the detection pinhole can be omitted in this arrangement. The light 71 leaving the sample 39 is focussed by the condenser optics 55 and delivered via the mirror 73 to the detector 49, which is embodied as a photomultiplier. A filter 75, which stops out the light with the wavelength of the excitation light beam and the emission light beam, is arranged in front of the detector 49. The excitation light beam 63 is generated by the first light source 61, which is embodied as a Ti:sapphire pulse laser. The emission light beam 69 is generated by the second light source 67, which involves an optical parametric oscillator. After combination with the aid of the dichroic beam combiner 59, the illumination of the sample takes place in a similar way to the illumination described in FIG. 2. So that the focal regions of the excitation light beam 63 and the emission light beam 69 remain static relative to one another even while the scanning movement is executed, a defocussing lens 65 is provided between the first light source 61 and the dichroic beam combiner 59. Together with the different lengths of the optical paths from the first and second light sources to the dichroic beam combiner 59, compensation is obtained for the axial chromatic aberration of all the other optics of the illumination-light beam path 41. To compensate for lateral aberrations, adaptive optics 57 are arranged in the part of the illumination-light beam path 41 which the excitation light beam 63 and the emission light beam 69 travel through together. They are controlled as a function of the setting of the scanning mirror 31 in the beam-deflection device 29.

The invention has been described with reference to a particular embodiment. It is, however, obvious that modifications and amendments may be made without thereby departing from the scope of protection of the following claims.

| PARTS LIST | |
|---|---|
| 1 | excitation light beam |
| 3 | emission light beam |
| 5 | microscope optics |
| 7 | focal region of the excitation light beam |
| 9 | focal region of the emission light beam |
| 11 | line |
| 13 | line |
| 15 | overlap region |
| 17 | first light source |
| 19 | excitation light beam |
| 21 | second light source |
| 23 | emission light beam |
| 25 | dichroic beam combiner |
| 27 | dichroic beam splitter |
| 29 | scanning module |
| 31 | scanning mirror |
| 33 | scanning optics |
| 35 | optics |
| 37 | microscope optics |
| 39 | sample |
| 41 | illumination beam path |
| 43 | emerging light |
| 45 | detector |
| 47 | detection pinhole |
| 49 | bandpass filter |
| 51 | illumination pinhole |
| 53 | adaptive optics |
| 55 | condenser optics |
| 57 | adaptive optics |
| 59 | dichroic beam combiner |
| 61 | first light source |
| 63 | excitation light beam |
| 65 | lens |
| 67 | second light source |
| 69 | emission light beam |
| 71 | emerging light |
| 73 | mirror |
| 75 | filter |

What is claimed is:
1. A scanning microscope comprising:
at least one light source for generating an excitation light beam of a first wavelength and an emission light beam of a second wavelength,
microscope optics for focusing the excitation light beam onto a first focal region in a first plane of a sample and for focusing the emission light beam onto a second focal region in a second plane of the sample, whereby the excitation light beam optically excites the sample in the first focal region and the emission light beam generates stimulated emission in the second focal region, and whereby the first and second focal regions are overlapping at least partially,
said light source and said microscope optics defining an illumination beam path
means for scanning the excitation light beam and the emission light beam onto a sample,
components for guiding and shaping being arranged in the illumination beam path, whereby optical properties of the components and of the microscope optics are matched to one another such that optical aberrations are corrected in such a way that the focal regions remain static relative to one another irrespective of the scanning movement.

2. The scanning microscope according to claim 1, whereby the aberrations are chromatic aberrations such as axial chromatic aberration, chromatic difference of magnification or lateral chromatic aberration.

3. The scanning microscope according to claim 1, whereby the aberrations are monochromatic aberrations such as spherical aberrations or coma or astigmatism, field curvature or distortion.

4. The scanning microscope according to claim 1 further comprising: optical correction means for compensating optical aberrations.

5. The scanning microscope according to claim 4, wherein the optical correction means act only on the excitation light beam.

6. The scanning microscope according to claim 4, wherein the optical correction means act only on the emission light beam.

7. The scanning microscope according to claim 4, wherein the optical correction means act on the excitation light beam and on the emission light beam.

8. The scanning microscope according to claim 4, wherein the optical correction means involve a lens.

9. The scanning microscope according to claim 4, wherein the optical correction means involve a drift section.

10. The scanning microscope to claim 4, wherein the optical correction means involve adaptive optics.

11. The scanning microscope according to claim 10, wherein the adaptive optics consists essentially of an LCD element, a micromirror or a deformable mirror.

* * * * *